W. G. MOXLEY.
AUTOMOBILE LIGHT TURNER.
APPLICATION FILED AUG. 26, 1911.
1,023,026.
Patented Apr. 9, 1912.
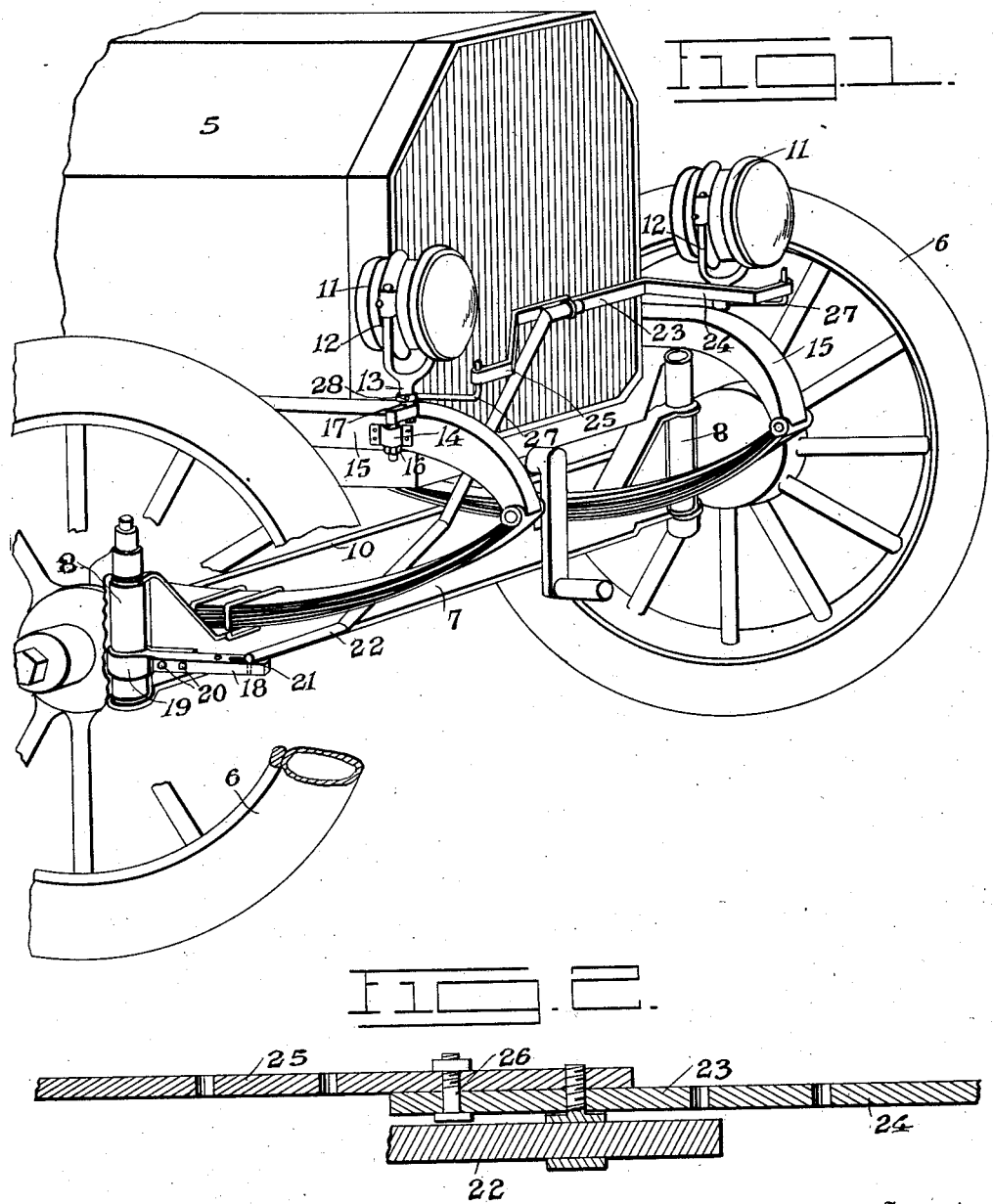
Witnesses
Inventor
Ward G. Moxley
By Victor J. Evans
Attorney

UNITED STATES PATENT OFFICE.

WARD G. MOXLEY, OF RAVENA, NEW YORK.

AUTOMOBILE LIGHT-TURNER.

1,023,026.      Specification of Letters Patent.      Patented Apr. 9, 1912.

Application filed August 26, 1911. Serial No. 646,231.

*To all whom it may concern:*

Be it known that I, WARD G. MOXLEY, a citizen of the United States, residing at Ravena, in the county of Albany and State of New York, have invented new and useful Improvements in Automobile Light-Turners, of which the following is a specification.

The general object of the invention is to move the headlights of a motor vehicle so as to direct the light to follow the road as the vehicle passes around curves, and to this end the invention consists in connecting the lamps with the steering wheel supports, the connection being adjustable so as to fit various types and sizes of cars and also adapted to be detachably connected to any car without any expensive adaptation of the same.

Other objects will appear and be better understood from the following description taken in connection with the accompanying drawings, in which, Figure 1 is a perspective of the front portion of an automobile, portions thereof being broken away to show the application of my invention thereto. Fig. 2 is a detail section of the cross arm.

5 indicates the vehicle body, 6 the steering wheels, 7 the front axle, 8 the knuckles connecting the front axle with the wheels, and 10 the usual rod connecting the knuckles. All the foregoing are commonly used in automobiles but it is to be understood that I am not to be limited to applying my invention to an automobile so constructed, since it is well known there are various types of automobiles now on the market, the steering wheels of which are connected otherwise than shown, therefore, I reserve the right, within the scope of the appended claim to apply my invention to any type of automobile or other vehicle wherein headlights are employed now in use.

11 indicates the lamps supported by yokes 12 which have stems 13 rotatable in sockets 14 which are connected in any preferred manner to any convenient portion of the vehicle, such as the springs 15. Any preferred means may be employed for preventing vertical movement of the stems in the sockets, such as nuts 16 screwed onto the lower ends of the stems, and collars 17 encircling the stems and bearing on the upper ends of the sockets 14.

18 indicates a rock arm which is adapted in any preferred manner, such as by a clamp strap 19 and bolts and nuts 20 to be detachably secured to one of the steering knuckles 8.

21 indicates a pin and slot connection between one end of the rock arm and an upwardly inclined rod 22.

23 indicates an extensible cross arm which has its middle portion herein shown as extending well above the path of movement of the usual crank arm employed for initially cranking or turning over the crank shaft of engines. The sections 24 and 25 of the cross arm are detachably connected in any preferred manner, such as by means of a clamp screw 26 insertible into any of a plurality of alining openings formed with the overlapping portions of the cross arm. By preference the opposite end portions of the cross arm are offset downwardly and outwardly and are pivotally connected to crank arms 27 adjustably secured such as by set screws 28, to the stem 13 of the lamp supports.

With this construction it will be seen that the lamps 11 will turn in unison with the wheels 6 when the latter are turned by the steering mechanism adjacent to the driver's seat and not shown. It will be further observed that the device may be readily connected to any automobile or analogous vehicle without changing the structure of the same and also readily disconnected from the said vehicle whenever desired.

In conclusion it may be stated that I am not to be limited to the specific arrangement or construction of parts herein shown since various changes may be made, within the scope of the appended claim without departing from the spirit or sacrificing any of the advantages of the invention.

What I claim as new is:

In a motor vehicle, the combination with the connected steering wheel supports and movable lamp supports; of a rock arm detachably secured to one of said steering wheel supports, cranks adjustably secured to the lamp brackets and located above the frame of the vehicle, an extensible arm connecting the cranks and comprising overlapping sections connected by an eye bolt, and a rod having one end arranged in the eye bolt, and a pin and slot connection between the opposite end of the rod and the rock arm.

In testimony whereof I affix my signature in presence of two witnesses.

WARD G. MOXLEY.

Witnesses:
E. W. MOXLEY,
MAE SHEAR.